United States Patent [19]

Divan

[11] Patent Number: 4,833,584
[45] Date of Patent: May 23, 1989

[54] QUASI-RESONANT CURRENT MODE STATIC POWER CONVERSION METHOD AND APPARATUS

[75] Inventor: Deepakraj M. Divan, Madison, Wis.

[73] Assignee: Wisconsin Alumni Research Foundation, Madison, Wis.

[21] Appl. No.: 109,705

[22] Filed: Oct. 16, 1987

[51] Int. Cl.<sup>4</sup> ............... H02M 5/458; H02M 7/5387
[52] U.S. Cl. ...................................... 363/37; 363/98; 363/132
[58] Field of Search ................... 363/27, 28, 41, 96, 363/97, 37, 132, 136, 137

[56] References Cited

U.S. PATENT DOCUMENTS

| | | |
|---|---|---|
| 3,213,287 | 10/1965 | King . |
| 3,222,587 | 12/1965 | Lichowsky . |
| 3,247,444 | 4/1966 | Clarke et al. . |
| 3,430,123 | 2/1969 | Corry et al. . |
| 3,678,367 | 7/1972 | McMurray ........................ 330/10 |
| 3,699,425 | 10/1972 | Hermansson et al. . |
| 3,742,336 | 6/1973 | Bedford . |
| 3,775,663 | 11/1973 | Turnbull ............................ 363/41 |
| 3,858,105 | 12/1974 | Gyugyl . |
| 3,875,494 | 4/1975 | Gyugyl . |
| 3,940,669 | 2/1976 | Tsuboi et al. . |
| 3,953,779 | 4/1976 | Schwartz . |
| 4,005,350 | 1/1977 | Brenneisen . |
| 4,013,937 | 3/1977 | Pelly et al. . |
| 4,086,622 | 4/1978 | Vukasovic ........................ 363/37 |
| 4,099,225 | 7/1978 | Nygaard .......................... 363/56 |
| 4,196,468 | 4/1980 | Shapiro et al. ................... 363/75 |
| 4,196,469 | 4/1980 | Gurwicz .......................... 363/131 |
| 4,227,243 | 10/1980 | Gurwicz et al. ................. 363/132 |
| 4,310,866 | 1/1982 | Wirth ............................. 363/132 |
| 4,333,134 | 6/1982 | Gurwicz .......................... 363/17 |
| 4,358,654 | 11/1982 | Estes .............................. 219/10.77 |
| 4,413,313 | 11/1983 | Robinson ........................ 363/80 |
| 4,429,359 | 1/1984 | Anderson ....................... 363/132 |
| 4,504,895 | 3/1985 | Steigerwald .................... 363/17 |
| 4,523,269 | 6/1985 | Baker et al. .................... 363/138 |
| 4,541,041 | 9/1985 | Park et al. ...................... 363/41 |
| 4,556,937 | 12/1985 | Ziogas ............................ 363/8 |
| 4,564,895 | 1/1986 | Glennon ......................... 363/41 |
| 4,635,181 | 1/1987 | Bourgeault ..................... 363/132 |
| 4,679,129 | 7/1987 | Sakakibara et al. ............. 363/98 |
| 4,729,085 | 3/1988 | Truskalo ......................... 363/98 |
| 4,730,242 | 3/1988 | Divan ............................. 363/37 |

FOREIGN PATENT DOCUMENTS

| | | |
|---|---|---|
| 2541687 | 3/1977 | Fed. Rep. of Germany . |
| 59478 | 4/1982 | Japan . |
| 6076 | 1/1983 | Japan ............................ 363/132 |
| 118069 | 6/1985 | Japan ............................ 323/222 |
| 463211 | 8/1975 | U.S.S.R. . |

OTHER PUBLICATIONS

Laszlo Gyugyi et al., "The High-Frequency Base Converter-a New Approach to Static High-Power Conversion," IEEE Trans. on Industry Appl., vol. 1A-15, No. 4, Jul./Aug., 1979, pp. 420-429.

(List continued on next page.)

Primary Examiner—William H. Beha, Jr.
Attorney, Agent, or Firm—Lathrop & Clark

[57] ABSTRACT

An inverter has a resonant circuit composed of a parallel connected inductor and capacitor and a filter capacitor connected in series with the inductor which has a capacitance substantially greater than the resonant capacitor. A half bridge or full bridge switching circuit formed of pairs of gate controlled switching devices is connected to a DC power supply and to the resonant circuit and filter capacitor, with the switching devices being switched to provide a relatively high frequency, e.g., 20 KHz or higher, resonant current in the resonant circuit. The filter capacitor is of a size such that the high frequency component of the current flowing in the resonant circuit does not result in a substantial voltage at the switching frequency appearing across the filter capacitor. In addition to the high frequency switching current in the resonant circuit, the switching frequency and the duration of switching is adjusted in a controlled manner such that a lower frequency AC component appears in the current flowing in the resonant circuit and through the filter capacitor such that a voltage at the lower frequency component appears across the filter capacitor.

17 Claims, 4 Drawing Sheets

OTHER PUBLICATIONS

Francisc C. Schwarz et al., "A Multikilowatt Polyphase AC/DC Converter with Reversible Power Flow and Without Passive Low-Frequency Filters," IEEE Trans. on Industrial Elect. and Control Instr., vol. IECI-28, No. 4, Nov. 1981, pp. 273-281.

Francis C. Schwartz, "A Doublesided Cycloconverter," IEEE Trans. on Industrial Elect. and Control Instr., vol. IECI-28, No. 4, Nov. 1981, pp. 282-291.

Robert L. Steigerwald, "High Frequency Resonant Transistor DC/DC Converter," IEEE Trans. on Industrial Elect., vol. IE-31, No. 2, May 1984, pp. 181-191.

D. M. Divan, "Design Considerations for Very High Frequency Resonant Mode DC/DC Converters", 1986 IEEE Industry Applications Society Conference, Denver, Colo., Sep. 28 to Oct. 1986, Conference Record pp. 640-647.

R. D. Lorenz and D. M. Divan, "Dynamic Analysis & Experimental Evaluation of Delta Modulators for Field Oriented AC Machine Current Regulators," 1987 IEEE Industrial Applications Society Annual Meeting, Atlanta, Ga., Oct. 18-23, 1987, Conference Record, pp. 196-201.

T. G. Habetler and D. M. Divan, "Rectifier/Inverter Reactive Component Minimization," 1987 IEEE Industrial Applications Society Annual Meeting, Atlanta, Ga., Oct. 18-23, 1987, Conference Record pp. 648-657.

D. M. Divan, "The Resonant DC Link Converter-A New Concept in Static Power Conversion," 1986 IEEE Industry Applications Society Conference, Denver, Colo., Sep. 28 to Oct., 1986, Conference Records, pp. 648-656.

D. M. Divan, "Power Converter Topologies for High Performance Motor Control Systems," 1987 CAMC Conference, Jun. 1987.

M. Kheraluwa and D. M. Divan, "Delta Modulationa Strategies for Resonant Link Inverters," 18th Annual IEEE Power Electronics Specialists Conference, Virginia Polytechnic Institute, Blacksburg, Va., Jun. 21-26, 1987, Conference Record, pp. 271-278.

O. D. Patterson and D. M. Divan, "Pseudo-Resonant Full Bridge DC/DC Converter," 18th Annual IEEE Power Electronics Specialists Conference, Virginia Polytechnic Institute, Blacksburg, Va., Jun. 21-26, 1987, Conference Record, pp. 424-430.

D. M. Divan and G. Skibinski, "Zero Switching Loss Inverters for High Power Applications," 1987 IEEE Industrial Applications Society Annual Meeting, Atlanta, Ga., Oct. 18-23, 1987, Conference Record, pp. 627-634.

G. L. Skibinski and D. M. Divan, "Characterization of Power Transistors Under Zero Voltage Switching," 1987 IEEE Industrial Applications Society Annual Meeting, Atlanta, Ga., Oct. 18-23, 1987, Conference Record, pp. 493-503.

QUASI-RESONANT CURRENT MODE STATIC POWER CONVERSION METHOD AND APPARATUS

This invention pertains generally to the field of static power converters and systems for the control of static power converters.

BACKGROUND OF THE INVENTION

The development and commercial availability of gate turn-off devices capable of handling relatively large power levels has resulted in a significant change in power conversion technology. For example, thyristors are now rarely used in force-commutated systems. To a large extent, the thyristor current source inverter has been replaced by GTO and transistor voltage source inverters at power ratings up to 1 megawatt (MW). The voltage source inverter is particularly attractive because of its extremely simple power structure and the need for only six uni-directional gate turn-off devices (for three-phase load power). The anti-parallel diodes required across each of the gate turn-off devices are typically provided by the manufacturer in the same device package for minimum lead inductance and ease of assembly. The control strategy for such voltage source inverters is reasonably simple and provides a fully regenerative interface between the DC source and the AC load. Despite the clear advantages of the voltage source inverter structure, the inherent characteristics of available gate turn-off devices imposes several limitations on the performance of the inverters. For example, the high switching losses encountered in such inverters mandates the use of low switching frequencies, resulting in low amplifier bandwidth and poor load current waveform fidelity (unwanted harmonics). The rapid change of voltage with time on the output of the inverter generates interference due to capacitive coupling. The parallel diode reverse recovery and snubber interactions cause high device stresses under regeneration conditions. In turn, the need to withstand the high device stresses reduces reliability and requires that the devices be overspecified. The relatively low switching frequencies required has also been observed to cause an acoustic noise problem because the switching frequency harmonics in the output power generate noise at audible frequencies in the switching system and motor. And, in general, present inverter designs have poor regeneration capability into the AC supply line, poor AC input line harmonics, requiring large DC link and AC side filters, and have poor fault recovery characteristics.

Ideally, a power converter should have essentially zero switching losses, a switching frequency greater than about 18 kHz (above the audible range), small reactive components and the ability to transfer power bi-directionally. The system should also be insensitive to second order parameters such as diode recovery times, device turn-off characteristics and parasitic reactive elements. It is clear that present voltage source inverter designs do not achieve such optimum converter characteristics.

It is apparent that a substantial increase in inverter switching frequency would be desirable to minimize the lower order harmonics in pulse width modulated inverters. Higher switching frequencies have the accompanying advantages of higher current regulator bandwidth, smaller reactive component size and, for frequencies above 18 kHz, acoustic noise which is not perceptible to humans. Increases in pulse width modulated inverter switching frequencies achieved in the last several years (from about 500 Hz to 2 kHz for supplies rated from 1 to 25 kW) have generally been accomplished because of improvements in the speed and ratings of the newer devices. An alternative approach is to modify the switching circuit structure to make best use of the characteristics of available devices.

One well-established approach is the use of snubber networks which protect the devices by diverting switching losses away from the device itself. The most popular snubber configuration is a simple circuit structure in which a small inductor provides turn-on protection while a shunt diode and capacitor across the device provide a polarized turn-off snubber. A resistor connected across the inductor and diode provides a dissipative snubber discharge path. Although the advantages of the use of snubbers in transistor inverters are well-known, packaging problems and the cost of the additional snubber components has made their commercial use infrequent. For GTO inverters, on the other hand, the snubber is absolutely essential for device protection and is often crucial for reliable and successful inverter design. While snubbers adequately alleviate device switching losses, the total switching losses do not change appreciably when losses in the snubber are considered, and can actually increase from the losses experienced in circuits unprotected by snubbers under certain operating conditions. Thus, the increases in inverter switching frequency which have been obtained with the use of snubbers carry a serious penalty in terms of overall system efficiency.

Another alternative is a resonant mode converter employing a high frequency resonant circuit in the power transfer path. Two distinct categories of resonant inverters can be identified. The first category, of which induction heating inverters and DC/DC converters are examples, accomplish control of the power transfer through a modulation of the inverter switching frequency. For these circuits, the frequency sensitive impedance of the resonant tank is the key to obtaining a variable output. While it is also possible to synthesize low frequency AC waveforms using such frequency modulation principles, complexity of control, the large number of switching devices required, and the relatively large size of the resonant components limits the applications for such circuit structures.

The second type of resonant converter, sometimes referred to as a high frequency link converter, typically uses naturally commutated converters and cycloconverters with a high frequency AC link formed of a resonant LC tank circuit. The high frequency link converters are capable of AC/AC or DC/AC conversion with bi-directional power flow and adjustability of the power factor presented to the AC supply. In contrast to the frequency modulation scheme of the first category of converters, the link frequency is not particularly important and output AC waveform synthesis is done through modulation of the output stage. For naturally commutated switching devices, phase angle control is ordinarily used. The high frequency link converter is generally capable of switching at frequencies greater than 18 kHz using available devices at the multi-kilowatt power level. However, the technology has not been economically competitive and has not been widely used industrially for variable speed drive type applications. This may be attributed to several factors. In particular, the large number of bi-directional high speed, high power switches required must be realized using available uni-directional devices. For example, as many as thirty-six thyristors may be required in addition to an excitation inverter in some configurations. The recovery characteristics of the devices used often necessitate the addition of snubber networks, lowering the efficiency of the overall system. In addition, the LC resonant circuit handles the full load power which is transferred from input to output and has large circulating currents, e.g., often up to six times the load current. Consequently, even though the total energy stored in the system is small, the volt-ampere rating of the resonant elements is quite high. Furthermore, control of such systems is extremely complex given the simultaneous tasks of input and output control, high frequency bus regulation, and thyristor commutation for circuits employing naturally commutated thyristors.

These conventional approaches to voltage source inverter design assume an a priori relationship between the inverter losses and the inverter switching frequency. Most of these commercial designs utilize gate turn-off devices and operate in the 1 to 2.5 KHz frequency range for power levels between 1 and 50 kilowatts. For commercially available devices, turn-on and turn-off times of 1 to 2 microseconds are readily available, as are storage times of 5 to 15 microseconds, enabling these devices to switch at higher frequencies than used in conventional designs. Although the exact switching frequency is a trade off between system performance and efficiency, commercially available designs tend to be thermally limited. In a typical design, approximately 30 to 50% of the total device losses derive from switching losses. Thus, inverter designs which reduce or eliminate switching losses can yield several benefits. By decoupling the inverter losses from the switching frequency, better device utilization is permitted. Both the inverter switching frequency and the r.m.s. current rating can be substantially increased before thermal limitations occur. The resonant converters described above can operate with lower switching losses but have not been widely utilized for the reasons discussed.

A resonant DC link inverter design has been developed which overcomes the most serious objections to the conventional resonant converters. This design is disclosed in U.S. patent application Ser. No. 912,080 by the present applicant, filed Sept. 25, 1986 now U.S. Pat. No. 4,730,242, entitled Static Power Conversion Method and Apparatus Having Essentially Zero Switching Losses. An LC resonant tank circuit is excited in such a way as to set up periodic oscillations on the inverter DC link. Under appropriate control, the DC link voltage can be made to go to zero for a controlled period of time during each cycle. During the time that the DC link voltage goes to zero, the devices across the DC link can be turned on and off in a lossless manner. By eliminating device switching losses, the inverter switching frequencies can be raised to above 20 KHz at power ratings of 1 to 25 KW using commercially available switching devices such as darlington bipolar junction transistors. Inverter operation is also compatible with uniformly sampled zero hystereis bang-bang controllers, referred to as delta modulators. When operated with delta modulation strategies, resonant link converters are capable of better performance than hard switched pulse width modulated voltage source inverters. The resonant DC link inverter also has a simple power structure and non-catastrophic fault mode which makes the inverter both rugged and reliable. The major limitation of the resonant DC link inverter is the imposition of device voltage stresses of 2.5 to 3 times the DC supply voltage. A discrete pulse modulation strategy for such resonant link inverters, such as sigma delta modulation, can also yield substantial spectral energy at frequencies much lower than the resonant link frequency. The device stresses in such resonant DC link inverters can be reduced using clamping of the DC link voltages, as set forth in co-pending application Ser. No. 101,193, filed Sept. 25, 1987, entitled Static Power Conversion Method and Apparatus Having Essentially Zero Switching Losses and Clamped Voltage Levels. The present invention provides an alternate circuit design to that disclosed in the aforesaid applications, which also realizes high level power conversion with essentially zero switching losses.

SUMMARY OF THE INVENTION

In accordance with the present invention, DC to AC and AC to AC power conversion is accomplished with substantially zero switching losses at switching frequencies to 20 kilohertz and above over a wide range of power ratings. Current and voltage stresses imposed on the switching devices are moderate and substantial improvements are obtained in the spectral response obtained at the inverter outputs compared to conventional commercially available inverters. The apparatus of the invention operates in a quasi-resonant manner, utilizing an inductor-capacitor resonant circuit, with the directly controlled parameter being the inductor current, thereby operating as a current mode inverter. The quasi-resonant current mode inverter combines clamped voltage stresses on the switching devices with the availability of true pulse width modulation and sinusoidal output voltages.

In the inverter apparatus of the invention, an additional filter capacitor is connected in series with the inductor of the resonant circuit, the filter capacitor having a capacitance which is substantially greater than the capacitance of the resonant capacitor so that the resonant frequency will be determined primarily by the resonant circuit capacitor and inductor. The output power from the inverter is taken across the filter capacitor, which filters out the high frequency switching components, leaving only an AC component, at a much lower frequency than the switching frequency, which has a substantially sinusoidal wave shape. A switching means is supplied with DC power and includes at least a pair of switching devices which are connected together at a node and to which the resonant circuit inductor and capacitor are also connected. Preferably, the resonant circuit capacitor is comprised of two separate capacitors with a resonant circuit capacitor connected across each one of the switching devices in the pair of switching devices.

For a single phase inverter, the power source may be composed of two separate voltage sources of substantially equal supply voltage which are connected in series across the pair of switching devices and which are connected together at a node, with the resonant inductor and the filter capacitor connected between the node of the switching devices and the node of the power sources. When the switching devices are switched on, the voltage across the resonant circuit inductor and series connected filter capacitor is clamped to the voltage of one of the pair of voltage sources. The switch is turned off at a time when current is flowing in the switch, and not in an anti-parallel diode connected in parallel with the switch, and with zero voltage across the switch so that substantially no switching loss occurs. The current flow is then transferred to the resonant capacitor. A minimum inductor current is required at the time of switching to insure that the resonant circuit resonates to drive the voltage level back to the opposite clamping voltage, that is, to the voltage of the other of the two power sources in the pair. When this voltage is reached, the second of the switches in the pair (which has zero voltage across it at this time) can be turned on to clamp the voltage across the series connected filter capacitor and resonant inductor at the voltage of the second power source. When a sufficient current is built up in the inductor to insure that the resonant circuit will resonate sufficiently to drive the voltage across the resonant circuit back to the voltage of the first voltage source, the switch can be turned off and the resonant cycle repeated. For ideal inductor and capacitor elements, the minimum switching current in the inductor is chosen to be greater than or equal to the square root of the product of the voltage of each power source and the output voltage across the filter capacitor divided by the square root of the inductance of the resonant circuit inductor, all divided by the capacitance of the resonant circuit capacitor. The output voltage across the filter capacitor will be a relatively slowly varying sine wave, e.g., a sine wave with a frequency from 60 to 400 Hz, while the voltage across the series connected inductor and the filter capacitor, and the current through the inductor, may vary at a much higher switching frequency. For example, the current through the inductor will appear substantially as a triangular wave at a frequency which may be as much as 20,000 Hz or higher. Preferably, the switching frequency is relatively high, e.g., in the range of 18,000 Hz to 20,000 Hz or higher, so that the switching frequencies are above the audible range.

Under steady state operation when a low frequency voltage is generated across the filter capacitor, the switching frequency of the pairs of switching devices and the duty cycle both vary continuously depending on the output voltages across the filter capacitor and the minimum and maximum inductor current envelopes which are selected to generate the desired low frequency output current through the filter capacitor. These minimum and maximum current envelopes are selected to insure that the condition for sustained resonance is satisfied and so that the average of the minimum and maximum current envelopes approximates the desired low frequency output current which will be impressed through the filter capacitor and which will appear as output voltage across the output terminals of the inverter. The capacitance of the resonant circuit capacitor or capacitors is preferably chosen so that during the switching cycle, as the current in the switching device which is turning off goes to zero, a relatively moderate voltage will be developed across that switching device, preferably as low as possible, thus reducing substantially the switching losses incurred in that switching device.

The inverter of the present invention can be extended to provide three phase output power by utilizing three pairs of switching devices connected in a bridge configuration, with the node joining each pair of switching devices being connected to a series connected resonant inductor and filter capacitor, and with the filter capacitor of each of the three phases connected together in either a wye or delta configuration. The output voltages for each of the three phases are again taken across the filter capacitors, and the resonant capacitors are preferably separate capacitors connected across each of the switching devices in the three pairs of switching devices.

A bridge configuration may also be utilized for single phase output, employing two pairs of switching devices and a single power supply, and with the resonant circuit and filter capacitor connected between the nodes joining the switching devices in each pair.

By providing AC output voltages in either of the single phase or three phase configurations, bidirectional power flow is allowed through the inverter and an AC to AC converter can also be realized by using two current mode inverters and operating them back-to-back off of the same DC bus.

Further objects, features and advantages of the present invention will be apparent from the following detailed description when taken in conjunction with the accompanying drawings.

DESCRIPTION OF THE PREFERRED EMBODIMENTS

Figure 1:
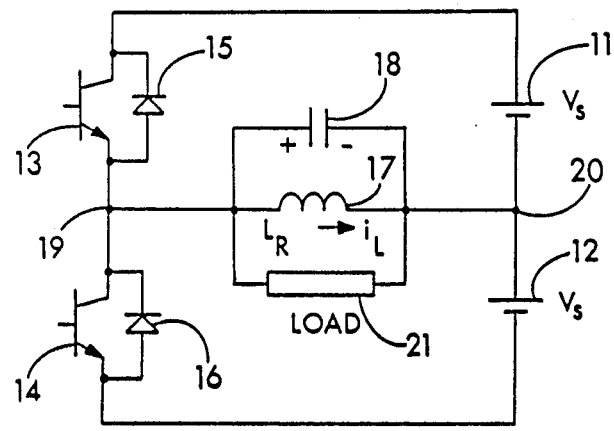
FIG. 1 is a schematic circuit diagram of a resonant pole circuit shown for purposes of illustrating the circuit operation principles of the present invention.
Figure 2:
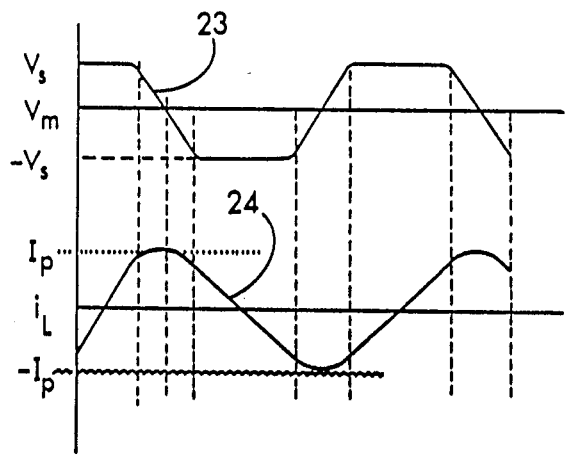
FIG. 2 are graphs of voltage and current waveforms in the circuit of FIG. 1.

With reference to the drawings, a resonant pole circuit helpful in explaining the circuit principles of the present invention is shown in FIG. 1. This circuit can be used to provide dc to ac power conversion at the switching frequency and dc to dc power conversion but is not capable of dc to ac conversion at an output frequency lower than the switching frequency. The circuit includes two voltage sources 11 and 12 of essentially identical voltage level $V_s$, a pair of switching devices 13 and 14 (illustrated as bipolar transistors with anti-parallel diodes 15 and 16) configured in an inverter pole and a resonant circuit composed of a parallel inductor 17 and capacitor 17 connected between the node 17 at which the two switching devices 13 and 14 are connected together and the node 20 at which the two voltage sources 11 and 12 are connected. A load 21 is connected across the resonant circuit to receive the voltage across the inductor The voltage level stresses imposed on the switching devices are clamped at the voltage $V_s$ of the voltage supplies 11 and 12. In operation, the first switch 13 is turned on until the current $i_L$ in the inductor 17 is positive in the direction shown and equals a reference value $I_p$. The switch 13 is turned off at this point to transfer the current in the inductor $i_L$ to the capacitor 18, and the resonant pole voltage $V_m$, the voltage between the nodes 18 and 19, reverses to the level of the negative supply voltage, $-V_s$, in a resonant manner. By choosing an appropriate value for capacitance of the capacitor 18, a zero voltage turn off for the switch 13 can be attained. When the pole voltage $V_m$ reaches minus $V_s$, the diode 16 in parallel with the switch 14 turns on, whereupon the switch 14 can be turned on in a lossless manner. With the switch 14 and/or the antiparallel diode 16 conducting, the inductor current $i_L$ decreases linearly until it reaches a value $-I_p$, at which time the switch 14 can be turned off, and the resonant cycle repeated. FIG. 2 shows graphs illustrating the pole voltage $V_m$ wave form 23 and the inductor current $i_L$ wave form 24. The frequency of the output voltage $V_m$ which is delivered to the load 21 will thus be at the switching frequency of the devices 13 and 14. The load 21 can comprise a full wave rectifier which delivers DC voltage to a power consuming load. However, the circuit of FIG. 1 does not provide variable low frequency output voltage to the load and thus cannot serve generally as a DC to AC inverter.

Figure 3:
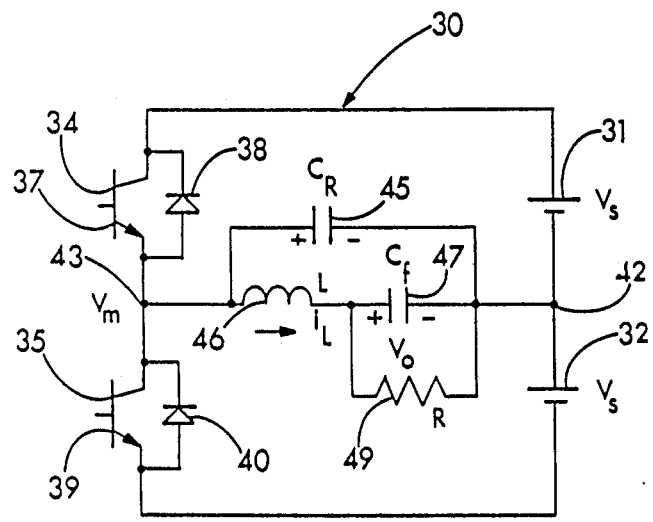
FIG. 3 is a schematic circuit diagram of a single phase quasi-resonant current mode inverter in accordance with the present invention.

In accordance with the present invention, an inverter utilizing a resonant pole for DC to low frequency AC inverter operation is shown generally at 30 in FIG. 3. The inverter 30, which may be designated a quasi-resonant current mode inverter, includes power supplies 31 and 32 of substantially equal supply voltage $V_s$, an inverter pole composed of switching devices 34 and 35 (which as shown, may be composed, respectively, of gate controlled devices such as the bipolar transistor 37 and anti-parallel diode 38 and bipolar transistor 39 and anti-parallel diode 40), with the voltage sources 31 and 32 connected together at a node 42 and the switching devices 34 and 35 connected together at a node 43. A resonant circuit composed of a capacitor 45 and inductor 46 is connected in parallel between the nodes 43 and 42 and, in addition, a filter capacitor 47 is connected in series with the inductor 46 between the nodes 43 and 42. The output voltage from the inverter is taken across the filter capacitor 47 and is supplied to a load illustratively shown as a resistor 49. The phase voltage $V_m$ between the nodes 43 and 42 is shown by the graph labeled 51 in FIG. 6 and the current $i_L$ through the inductor 46 is shown by the graph labeled 52 in FIG. 6. To illustrate the principles of operation of this circuit, the case may first be considered where it is desired to generate a DC level output voltage $V_o$ across the load resistance 49. If the positive and negative trip currents $I_p$ at which switching takes place are changed so that the average inductor current is equal to $V_o/R$, (where R is the resistance of the resistor 49) the output voltage will then be held at $V_o$. It is apparent that this relationship holds true for all polarities of load voltage and current, indicating that the circuit 30 can operate as an inverter. Furthermore, as the directly controlled parameter is the inductor current, the circuit 30 may be referred to as a current mode inverter.

Figure 6:
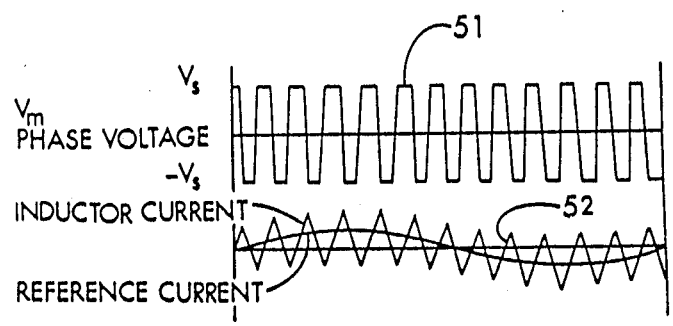
FIG. 6 are graphs of current and voltage waveforms for the inverter of FIG. 3.

The operation of the inverter 30 can be viewed as composed of two distinct modes, which repeat every half cycle, with FIG. 6 showing the wave forms for the synthesis of an AC current illustrating the relationships between phase voltage and inductor current during the two modes. In the first mode, during which one or the other of the switches 34 and 39 is turned on, the phase voltage $V_m$, which is also the voltage imposed across the capacitor 45, is equal to the supply voltage $V_s$ (or minus $V_s$). The state equations for the inductor current $i_L$ and output voltage $V_O$ are:

$$\dot{i}_L = (V_s - V_O)/L$$

$$\dot{V}_O = (i_L - V_O/R)/C_f$$

where L is the inductance of the inductor 46, R is the resistance of the resistor load 49, and $C_f$ is the capacitance of the filter capacitor 47. In the second mode, the switches 34 and 35 are turned off, and the voltage across the resonant capacitor 45 is no longer clamped to the supply voltage. The state equation for the phase voltage $V_m$ is thus $\dot{V}_m = -i_L/C_r$, where $C_r$ is the capacitance of the resonant capacitor 45.

The switching conditions are determined based on two constraints. The first constraint is zero voltage switching, which requires that current be flowing in the switch to be turned off, and that the current be sufficient to insure that the pole voltage $V_m$ reach the opposite voltage supply level. Assuming that the capacitance of the filter capacitor is much greater than the capacitance of the resonant capacitor, by applying conservation of energy over the first mode, the minimum value $I_{Lmin}$ of inductor current required to reverse the pole voltage is:

$$I_{Lmin} = \frac{2}{Z_o} \sqrt{V_s V_o}$$

where $Z_O = (L/C_r)^{\frac{1}{2}}$. This equation assumes lossless inductive and capacitive components. The actual value of $I_{Lmin}$ would have to be greater than the value computed by the equation above to compensate for losses in the inductive and capacitive components.

A second constraint on system performance is the variation of the switching frequency with the output voltage $V_O$. Assuming that the transitions between turn off of one device and turn on of the other form a small part of the entire cycle, the inductor current can be assumed to be substantially triangular in form. Inasmuch as $V_O$ varies slowly compared to the phase voltage $V_m$, for purposes of analyzing this constraint the output voltage can be assumed to be substantially DC. For an output current $I_O = V_O/R$, the switching period T can be calculated to be at least (assuming large $Z_O$):

$$T = \frac{4 V_s I_o L}{(V_s^2 - V_o^2)}$$

The equation above for T implies that for a given load current level, as the output voltage $V_o$ varies from 0 to 0.8 $V_s$, the switching frequency F varies from a maximum, $F_{max}$, to 0.36 $F_{max}$. If the output voltage increases to 0.9 $V_s$, the switching frequency goes to 0.19 $F_{max}$, and if the output voltage $V_o$ equals the supply voltage level $V_s$, zero frequency results. This indicates that the lowest desirable switching frequency sets a limit on the maximum output voltage (modulation index) obtainable. For a sinusoidally varying output voltage $V_o$, it can be seen that the instantaneous switching frequency would sweep from a maximum value at $V_o=0$ to a minimum at the peak voltage point.

Figure 4:
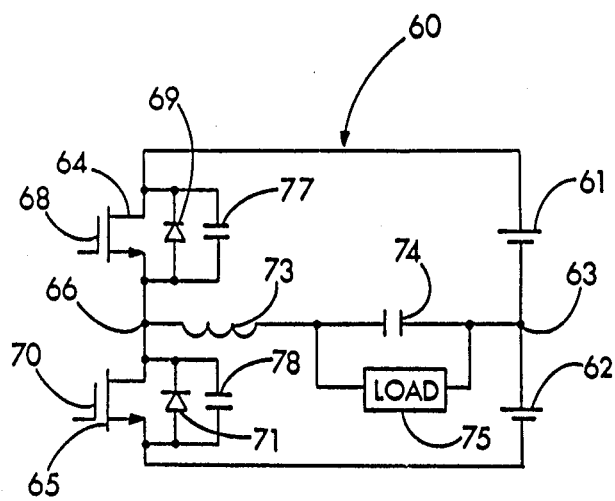
FIG. 4 is a schematic circuit diagram of a single phase quasi-resonant current mode inverter in accordance with the invention having separate resonant circuit capacitors for each of the two switching devices.

A single phase quas resonant current mode inverter which has a different circuit structure but is otherwise equivalent to the circuit of FIG. 3 is shown generally at 60 in FIG. 4. The circuit 60 has two power sources 61 and 62, each providing output voltage $V_s$ which are connected together at a node 63, and an inverter pole composed of a pair of switching devices 64 and 65 which are connected together at a node 66. In the inverter 60 of FIG. 4, the switching device 64 is illustratively shown composed of a power MOSFET 68 and anti-parallel diode 69 and the switching device 65 as a power MOSFET 70 with anti-parallel diode 71. As in the inverter 30 of FIG. 3, the resonant circuit inductor 73 is connected in series with a filter capacitor 74 across the phase terminals 66 and 63 and the output voltage $V_o$ is provided across the filter capacitor 74 to a load 75. However, in the circuit 60, the single resonant capacitor 45 of the circuit 30 of FIG. 3 is split into two substantially equal resonant capacitors 77 and 78 which are connected across, respectively, the switching devices 68 and 70. It is apparent that the resonant circuit composed of the resonant capacitors 77 and 78 and the resonant inductor 73 is entirely equivalent to the resonant circuit in the inverter 30 composed of the resonant capacitor 45 and resonant inductor 46 assuming that the power sources 61 and 62 are ideal and have substantially no internal impedance. It is seen that the capacitor 77 and 78 are effectively connected in parallel with one another across the phase nodes 66 and 63. Thus, if each of the capacitors 77 and 78 have one half of the capacitance of the resonant capacitor 45 of FIG. 3, an equivalent resonant frequency is obtained for both of the inverters 30 and 60, assuming that the inductors 46 and 73 have the same inductance and that the filter capacitors 47 and 74 are substantially larger in capacitance than the resonant capacitor so that the filter capacitors do not substantially affect the resonant frequency of the resonant circuit.

Figure 5:
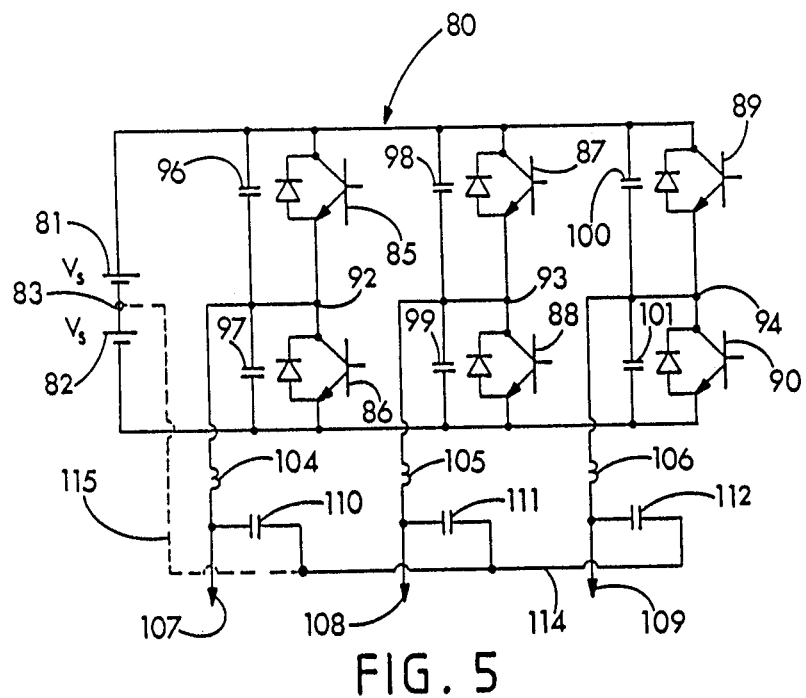
FIG. 5 is a schematic circuit diagram of a three phase quasi-resonant current mode inverter in accordance with the invention.

A three phase realization of a quasi resonant current mode inverter is shown generally at 80 in FIG. 5. The inverter 80 has a pair of power sources 81 and 82 of voltage level $V_s$ connected together at a node 83 and three pairs of switching devices 85-90 each composed of a bipolar transistor and anti-parallel diode, with the three pairs being connected together at nodes 92-94 in a bridge configuration. Resonant capacitors 96-101 are connected across the switching devices 85-90, respectively, and the three phase nodes 92-94 have resonant inductors 104-106 connected thereto and supply three phase output terminals 107-109 respectively. The output terminals 107-109 have respective filter capacitors 110-112 connected thereto, with each of the capacitors 110-112 being connected together to a common node line 114 which may optionally be connected by a conducting line 115, shown in dash lines in FIG. 5, to the node 83 joining the voltage sources 81 and 82. However, the conducting line 115 is not required, and if eliminated, the filter capacitors 110-112 may be connected together in either a wye configuration as shown, or a delta configuration. If the conducting line 115 is not present, the split voltage sources 81 and 82 may be combined into a single voltage source. The three phase circuit of FIG. 5 operates under the same conditions and in the same manner as described above for the circuit of FIG. 3, with the three phase currents being individually monitored to meet the conditions specified above. Of course, it is also apparent that a full bridge single phase output may be achieved in accordance with the present invention utilizing two of the pairs of switching devices of FIG. 5 rather than all three. For a single phase full bridge circuit, the output would be taken across two terminals, say terminals 107 and 108, in which case the resonant capacitors 110 and 111 may be combined into a single equivalent capacitor and the resonant inductors 104 and 105 may be combined into a single equivalent inductor.

Figure 9:
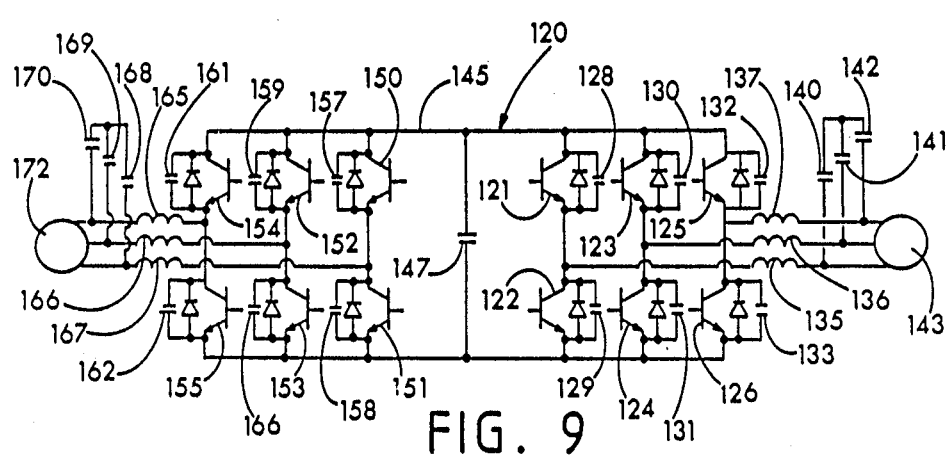
FIG. 9 is a schematic circuit diagram of an AC to AC converter in accordance with the present invention which utilizes two quasi resonant current mode inverters which interface between two three phase systems.

A further extension of the invention to an AC to AC converter can be realized by utilizing two current mode inverters operating back-to-back off of the same DC bus. Such an AC to AC conversion system is shown generally at 120 in FIG. 9. The converter 120 has a three phase output inverter having switching devices 121-126 connected in pairs with resonant capacitors 128-133 connected across the switching devices. The three phase output from the connections between the pairs of switching devices is provided to resonant inductors 135-137 and filter capacitors 140-142 are connected across the three phase output terminals which are available for connection to a three phase load-source 143. The inverter receives DC power from DC bus lines 145 and 146, across which is connected a large filter capacitor 147 to filter out the ripples on the DC bus. A rectifying converter composed of switching devices 150-155 is also connected in pairs across the DC bus lines 145 and 146 and has resonant capacitors 157-162 connected across the switching devices. The nodes connecting the two switching devices in each pair are connected to resonant inductors 165-167 and filter capacitors 168-170 are connected applied to the three phase input terminals which are connected to a three phase power source 172. The three phase converter receives the three phase power from the source 172 and converts it to DC power across the bus lines 145 and 146. Reverse directional transfer of energy from the load 143 to the source 172 can be obtained by reversing the function of the inverter and converter so that the inverter composed of the switching devices 121-126 functions to rectify power provided from the load 143 to DC power on the lines 145 and 146, and the converter composed of the devices 150-155 can be switched in a proper fashion to invert the DC power on the bus lines to AC power which is supplied to the source 172.

The proper control conditions for quasi resonant current mode inverters in accordance with the present invention can be further understood with reference to the single phase circuit of FIG. 3. As noted above, the capacitance of the filter capacitor 47 is sufficiently high that this capacitor essentially passes the high frequency component of the inductor current so that no substantial high frequency voltage is developed across the filter capacitor. However, the output voltage across the filter capacitor 47, $V_o$, has a substantial low frequency content which is the desired output voltage. Preferably, the capacitance of the filter capacitor 47 is at least an order of magnitude greater than the capacitance of the resonant capacitor 45. Such a condition insures that the high frequency ripple in the output voltage $V_o$ is maintained at reasonably low levels, which is an important consideration for proper modulation.

Figure 7:
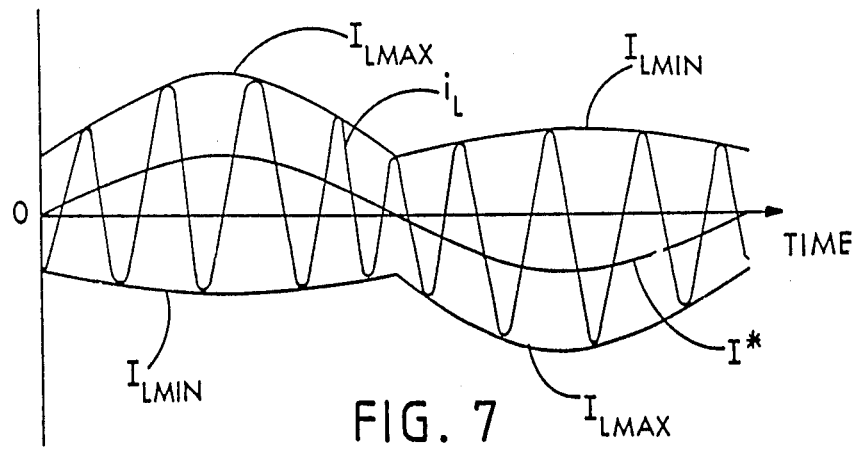
FIG. 7 is an illustrative graph showing the manner in which a desired inductor current can be synthesized by specifying minimum and maximum current envelopes for the inductor current, yielding an average low frequency AC inductor current.

Because the output voltage $V_o$ varies at a low frequency, it can be at a voltage level substantially different from zero over a large number of switching cycles. Consequently a net transfer of energy from the inductor to the filter capacitor 47 is required over each switching cycle. To generate a low frequency wave form across the filter capacitor and the load connected in parallel with it, the inductor current $i_L$ must be controlled such that the low frequency component of current through the filter capacitor generates the desired output voltage. Thus, the capacitance of the filter capacitor is chosen so as to filter out the high switching frequency components but still support the low frequency component. The modulation strategy controlling the switching of the switches 34 and 35 must satisfy the requirement for maintaining the necessary minimum current $i_{Lmin}$ to allow each resonant cycle to continue. A maximum current envelope $I_{Lmax}$, then determines, with the minimum current envelope, the resulting low frequency output current $I^*$ which is desired by the designer. The minimum and maximum current envelopes and the resulting low frequency output current wave form $I^*$ are shown illustratively in FIG. 7. Under steady state operation, where a low frequency sinusoidal voltage is being generated across the filter capacitor 47, the switching frequency and the duty cycle will both vary continuously, as illustrated in FIG. 7, depending on both the desired output voltage $V_o$ and the $I_{Lmin}$ and $I_{Lmax}$ envelopes which are selected. These envelopes are chosen so as to insure the switching condition given above and to cause the average of the minimum and maximum envelopes to approximate the desired output current wave form $I^*$. The value of the resonant capacitor or capacitors is chosen so that during the switching cycle, as the current in the device which is turning off goes to zero, a moderate voltage will be developed across the device (preferably as low as possible) to reduce to as great an extent as possible the switching losses incurred in the device.

Figure 8:
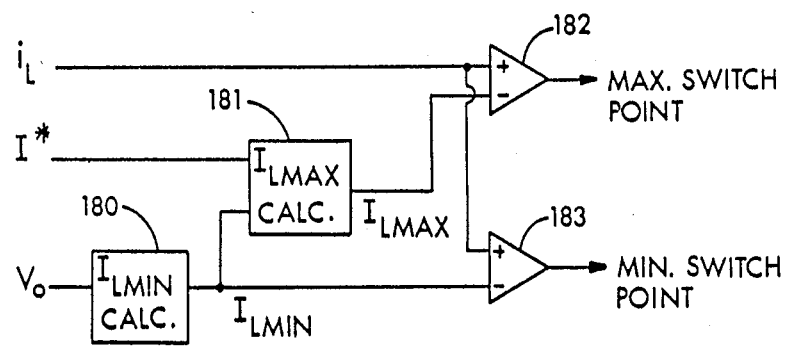
FIG. 8 is a block diagram showing a controller which provides the switching control signals to the switching devices of a quasi-resonant current mode inverter circuit in accordance with the invention.

An exemplary controller arrangement for the inverter of the invention is shown in FIG. 8, wherein the controller receives as input variables the actual time varying inductor current $I_L$ (received from a current sensor in series with the inductor 46), the desired low frequency component of the inductor current $I^*$, and the actual output voltage $V_o$ across the filter capacitor (received from a voltage sensor). The value of the output voltage $V_o$ is operated on at 180 to compute a minimum value of the inductor current required $I_{Lmin}$, which may be computed in accordance with the criterion given above for the minimum required current level. Depending on the circuit conditions, the output of the block 180 is a minimum current $I_{Lmin}$ which is selected to insure the desired maintenance of resonance in the circuit, and the value of $I_{Lmin}$ and the desired low frequency component $I^*$ are then utilized as input variables for a calculation at 181 of $I_{Lmax}$. This calculation is carried out so as to yield an $I_{Lmax}$ which results in the average of $I_{Lmax}$ and $I_{Lmin}$ being approximately equal to $I^*$. The $I_{Lmax}$ value is then compared with the actual inductor current value $I_L$ in a comparator 182 to determine a maximum switching point and the $I_{Lmin}$ value is compared with the actual current $I_L$ in a comparator 183 to determine the minimum switching point. These values are then used in a conventional fashion to provide switching inputs to the switching devices 34 and 35. Preferably, the controller of FIG. 8 is implemented as a microprocessor based programmable controller which carries out the calculations shown in the blocks 180 and 181 utilizing software algorithms in a conventional fashion well known in the art. Although a mircroprocessor system allowing reprogrammable software to be utilized is preferred, the blocks 180 and 181 may also be implemented in a conventional fashion using hard wired circuit components.

As an example of the implementation of the present invention, an inverter topology in accordance with the three phase implementation of FIG. 5 was fabricated and tested which operated off of a 150 volt DC bus at peak load currents of 30 amperes. Bipolar switching transistors with anti-parallel diodes were utilized as the switching devices. Each of the resonant inductors had an inductance of 60 microhenries, each resonant capacitor had a capacitance of 0.25 microfarads, and each filter capacitor had a capacitance of 30 microfarads. The inverter was used as non-interruptable power supply inverter with sinusoidal output, being switched at approximately 25 KHz under no load conditions which reduced to 12 KHz at full load. A pulse width modulation (PWM) strategy was utilized as discussed above. The value if $I_{Lmin}$ was preselected to correspond to the maximum value of $V_o$ to be obtained during normal operation. The lowest spectral content of the output voltage $V_o$ to the load was approximately 10 KHz, the average switching losses were less than 10% of the switching losses in a conventional PWM inverter, the maximum voltage stress imposed on the switching devices was equal to the supply voltage $V_s$ and the maximum current stress was slightly more than two times the maximum output current while the r.m.s. current ratio was approximately 1.2 times the output current. The output voltage was substantially sinusoidal.

It is apparent that a wide variety of gate controlled switching devices may be utilized as the switching devices in the present invention. These include power MOSFETs, gate turn off thyristors, bipolar transistors, and bipolar darlington transistors, which may be commercially packaged with anti-parallel diodes or which may include inherent parasitic anti-parallel diodes.

It is also understood that the invention is not confined to the particular embodiments set forth herein, but embraces all such forms thereof as come within the scope of the following claims.

What is claimed is:

1. Quasi-resonant current mode power conversion apparatus comprising:
    (a) a resonant circuit having a resonant inductor and a resonant capacitor connected in a parallel configuration with respect to each other;
    (b) a filter capacitor connected in series with the resonant inductor and having substantially greater capacitance than the resonant capacitor, the output voltage across the filter capacitor being the output voltage of the power conversion apparatus;
    (c) a switching circuit including at least two switching devices, which are controllable to be turned on and off, connected together at a node to which the resonant inductor and capacitor are connected;
    (d) control means for switching the switching devices to cause a stable resonant oscillation in the resonant circuit when the switching circuit is provided with a supply voltage such that a high frequency AC resonant voltage oscillation is maintained across the resonant circuit and a lower frequency sinusoidal oscillation is maintained across the filter capacitor, the control means switching the switching devices on and off when the inductor current reaches selected minimum and maximum envelope values such that the average value of the inductor current yields a desired waveform which is at a substantially lower frequency than the frequency of switching of the switching devices.

2. Quasi-resonant current mode power conversion apparatus comprising:
(a) power supply means for supplying DC output power;
(b) a resonant circuit having an inductor and at least one capacitor connected in a parallel configuration with respect to each other;
(c) a filter capacitor connected in series with the resonant inductor and having substantially greater capacitance than the resonant capacitor, the output voltage across the filter capacitor being the output voltage of the power conversion apparatus;
(d) a switching circuit including at least one pair of switching devices connected together which are controllable to be turned on and off, and connected to the power supply means and to the resonant circuit;
(e) control means for switching the switching devices at the proper times to cause the resonant circuit to oscillate at a high frequency which is filtered out by the filter capacitor and does not substantially appear as a voltage across the filter capacitor and to also oscillate at a second lower frequency which appears as an alternating voltage across the filter capacitor, the control means switching the switching devices on and off when the inductor current reaches selected minimum and maximum envelope values such that the average value of the inductor current yields a desired waveform which is at a substantially lower frequency than the frequency of switching of the switching devices.

3. The power conversion apparatus of claim 1 including power supply means for providing DC power to the switching circuit.

4. The power conversion apparatus of claim 1 or 2 wherein the resonant capacitor comprises a resonant capacitor connected across each switching device.

5. The power conversion apparatus of claim 1 for 2 wherein the switching devices in the switching circuit each include a gate controlled switching device.

6. The power conversion apparatus of claim 5 wherein the switching devices each comprise as bipolar junction transistor and an anti-parallel diode connected thereto.

7. The power conversion apparatus of claim 2 or 3 wherein the power supply means includes a split power supply having two substantially equal voltage sources connected in series at a node and wherein the switching circuit comprises two switching devices connected in series at a node, and wherein the resonant circuit and the filter capacitor are connected between the power supply node connection and the node connection between the switching devices.

8. The power conversion apparatus of claim 2 or 3 wherein the switching circuit comprises at least two pairs of series connected switching devices with each pair being connected at a node in a bridge configuration, the bridge of switching devices receiving the supply voltage from the power supply means, and wherein the resonant circuit and filter capacitor are connected between the nodes connecting the pairs of switching devices.

9. The power conversion apparatus of claim 2 or 3 wherein the power supply means comprises converter means connected to an AC power system for rectifying the AC power from the power system and supplying DC output power to the switching circuit.

10. The power conversion apparatus of claim 9 wherein the converter means includes controllable switching devices connected in a bridge configuration and controlled such that the converter means can selectively rectify power form the AC power system and supply it to the switching circuit and selectively receive DC power from the switching circuit and convert it to AC power supplied to the AC power system.

11. The power conversion apparatus of claim 1 or 2 wherein switching of the switching devices in the switching circuit is controlled to take place at times when there is no less than a predetermined minimum current flowing through the resonant inductor, the minimum current being that which is required to complete the resonant cycle in the resonant circuit after switching off of the switching devices in the switching circuit.

12. The power conversion apparatus of claim 11 wherein the predetermined minimum current is greater than or equal to $$\frac{2}{Z_o} \sqrt{V_s V_o}$$

where
$Z_o = (L_r/C_r)^{\frac{1}{2}}$,

13. The power conversion apparatus of claim 2 or 3 wherein the switching circuit comprises three pairs of controllable switching devices connected in a bridge configuration and receiving the DC power from the power supply means across the bridge, the switching devices in each pair connected together at a node, and wherein the resonant circuit comprises resonant capacitors and resonant inductors connected between the nodes of the switching devices such that there is a resonant capacitor and resonant inductor connected between each two of the nodes.

14. The power conversion apparatus of claim 1 or 2 wherein each of the switching devices is a gate controlled switching device and the control means provides control signals to switch the switching devices on and off, the control means switching off the switching devices only when current is flowing through the switching devices.

15. The power conversion apparatus of claim 1 or 2 wherein the filter capacitor has a capacitance of at least ten times greater than the capacitance of each resonant capacitor.

16. A method for converting a DC supply voltage from a DC power source to an AC voltage, utilizing a resonant circuit comprised of a resonant inductor and a resonant capacitor connected in parallel, and a filter capacitor connected in series with the resonant inductor which is substantially larger in capacitance than the resonant capacitor, comprising the steps of:
(a) applying the DC supply voltage across the series connected resonant inductor and filter capacitor at a first polarity for a time sufficient to build up a desired current level in the inductor;

(b) then removing the supply voltage from the series connected inductor and filter capacitor to cause the current in the inductor to flow into the resonant capacitor until the voltage across the resonant inductor and filter capacitor is equal to the supply voltage at the opposite polarity;

(c) then applying the DC supply voltage to the resonant conductor and filter capacitor at the opposite polarity which matches the polarity of the voltage across the resonant circuit and filter capacitor at the time for a time sufficient to build up a selected current level in the inductor;

(d) then removing the supply voltage from the resonant inductor and filter capacitor to cause the current in the inductor to flow through the resonant capacitor until the voltage across the resonant inductor and filter capacitor is equal to the supply voltage of opposite polarity; and (e) then repeating steps (a) through (d) above;

wherein steps (a) through (e) are carried out such that the time of application of the supply voltage in each polarity to the resonant inductor and filter capacitor and the frequency of switching from one polarity to he other are selected to result in a time varying voltage appearing across the filter capacitor at a frequency substantially lower than the frequency of switching between the two polarities of the power supply voltage, and such that substantially no voltage varying at the switching frequency appears across the filter capacitor.

17. The method of claim 16 wherein the switching of the polarity of the supply voltage to the resonant inductor and filter capacitor is done by gate controlled switching devices having anti-parallel diodes connected thereto, and wherein the steps of removing the supply voltage is done by switching off the switching devices only when current is flowing through the switching devices.

* * * * *

UNITED STATES PATENT AND TRADEMARK OFFICE
CERTIFICATE OF CORRECTION

PATENT NO. : 4,833,584
DATED : May 23, 1989
INVENTOR(S): Deepakraj M. Divan

It is certified that error appears in the above-identified patent and that said Letters Patent is hereby corrected as shown below:

```
Column 13, line 47 "for" should be --or--.
Column 13, line 51 "as" should be --a--.
Column 14, line 13 "form" should be --from--.
Column 14, line 35 after "Z₀=(Lr/Cr)½," insert --Vs is
the DC voltage provided by the power supply means, V₀
is the output voltage across the filter capacitor, Lr
is the inductance of the resonant inductor and Cr is
the capacitance of the resonant capacitor.--
Column 15, line 13 "the" should be --that--.
Column 16, line 6 "he" should be --the--.
```

Signed and Sealed this

Eleventh Day of August, 1992

Attest:

DOUGLAS B. COMER

*Attesting Officer*     Acting Commissioner of Patents and Trademarks